US011656781B2

(12) United States Patent
Lyu et al.

(10) Patent No.: US 11,656,781 B2
(45) Date of Patent: May 23, 2023

(54) DISTRIBUTING SEQUENTIAL READ STREAMS ACROSS SYNCHRONOUS MIRROR PAIRS

(71) Applicant: International Business Machines Corporation, Armonk, NY (US)

(72) Inventors: Gang Lyu, Shanghai (CN); Yongjie Gong, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 16/599,254

(22) Filed: Oct. 11, 2019

(65) Prior Publication Data

US 2021/0109656 A1 Apr. 15, 2021

(51) Int. Cl.
*G06F 3/06* (2006.01)
*G06F 13/14* (2006.01)

(52) U.S. Cl.
CPC ............ *G06F 3/065* (2013.01); *G06F 3/0611* (2013.01); *G06F 3/0613* (2013.01); *G06F 3/0619* (2013.01); *G06F 3/0659* (2013.01); *G06F 3/0689* (2013.01)

(58) Field of Classification Search
CPC ........... G06F 3/061–0613; G06F 3/065; G06F 3/0659; G06F 3/0689
USPC ............. 711/114, 161, 162; 709/235; 710/74
See application file for complete search history.

(56) References Cited

U.S. PATENT DOCUMENTS

| 6,721,845 | B1 * | 4/2004 | Clegg | G06F 3/0689 |
| | | | | 709/201 |
| 6,766,416 | B2 * | 7/2004 | Bachmat | G06F 3/061 |
| | | | | 711/170 |
| 9,268,499 | B1 * | 2/2016 | Wilkins | G06F 3/0659 |
| 9,626,111 | B1 | 4/2017 | Diederich | |
| 10,732,873 | B1 * | 8/2020 | Lee | G06F 11/3428 |
| 2005/0262317 | A1 * | 11/2005 | Nakanishi | G06F 3/0635 |
| | | | | 711/162 |
| 2006/0218360 | A1 | 9/2006 | Burkey | |
| 2012/0096054 | A1 | 4/2012 | Egan | |

(Continued)

FOREIGN PATENT DOCUMENTS

FR 29863601 A 8/2013

OTHER PUBLICATIONS

IBM, "Algorithm for Parallel reads between a synchronous PPRC source and target", An IP.com Prior Art Database Technical Disclosure, Original Publication Date: Feb. 9, 2010, IP.com No. IPCOM000193071D, IP.com Electronic Publication Date: Feb. 9, 2010, 4 pages, <https://priorart.ip.com/IPCOM/000193071>.

(Continued)

*Primary Examiner* — Ilwoo Park
(74) *Attorney, Agent, or Firm* — David K. Mattheis

(57) ABSTRACT

Operating a data mirroring system comprising a primary storage and a secondary storage that maintains a synchronous copy of data in the primary storage by detecting at least one disk array of the primary storage is overdriven, determining one or more primary volumes mapped into the at least one disk array, identifying sequential read commands to the primary volumes, at least one sequential read stream comprising a series of sequential read commands to one of the primary volumes, and redirecting at least one sequential read stream to the secondary storage.

20 Claims, 5 Drawing Sheets

(56) References Cited

U.S. PATENT DOCUMENTS

| | | | |
|---|---|---|---|
| 2012/0166395 A1* | 6/2012 | Kaijima | G06F 11/2056 |
| | | | 707/655 |
| 2014/0237179 A1* | 8/2014 | Iwamura | G06F 3/0689 |
| | | | 711/114 |
| 2015/0046668 A1* | 2/2015 | Hyde, II | G06F 3/0689 |
| | | | 711/162 |
| 2018/0107570 A1* | 4/2018 | Hardy | G06F 11/0727 |
| 2018/0278685 A1 | 9/2018 | Tiwari | |
| 2020/0104045 A1* | 4/2020 | Barrell | G06F 3/0653 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

_US 11,656,781 B2_

DISTRIBUTING SEQUENTIAL READ STREAMS ACROSS SYNCHRONOUS MIRROR PAIRS

BACKGROUND

The present disclosure relates to data mirroring systems and, particularly, to a method, system and program product for dynamically distributing sequential read streams across synchronous mirror pairs.

Synchronous mirroring is an approach to data protection that involves data being written to a remote site and local storage at the same time. In a data mirroring system employing synchronous mirroring, production data of an application system is mirrored from a primary site to a secondary site. The primary site may be a local site and the secondary site may be a remote site. Each time data is written to a primary storage, usually located at the local site, it is also written to a secondary storage at the remote site. The secondary storage maintains a synchronous copy of the data in the primary storage. Such mirror or dual copies of data may ensure that the two sites are identical at all times. When the primary storage device is not able to serve a request, data can then be retrieved from the secondary storage.

SUMMARY

Aspects of the present disclosure include systems methods and computer program products associated with operating a data mirroring system including a primary storage and a secondary storage that maintain a synchronous copy of data in the primary storage, by detecting at least one overdriven disk array of the primary storage, determining one or more primary volumes mapped into the at least one disk array, identifying sequential read commands to the one or more primary volumes, generating at least one sequential read stream, including a series of sequential read commands to one of the primary volumes, and redirecting one or more of the at least one sequential read stream to the secondary storage.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
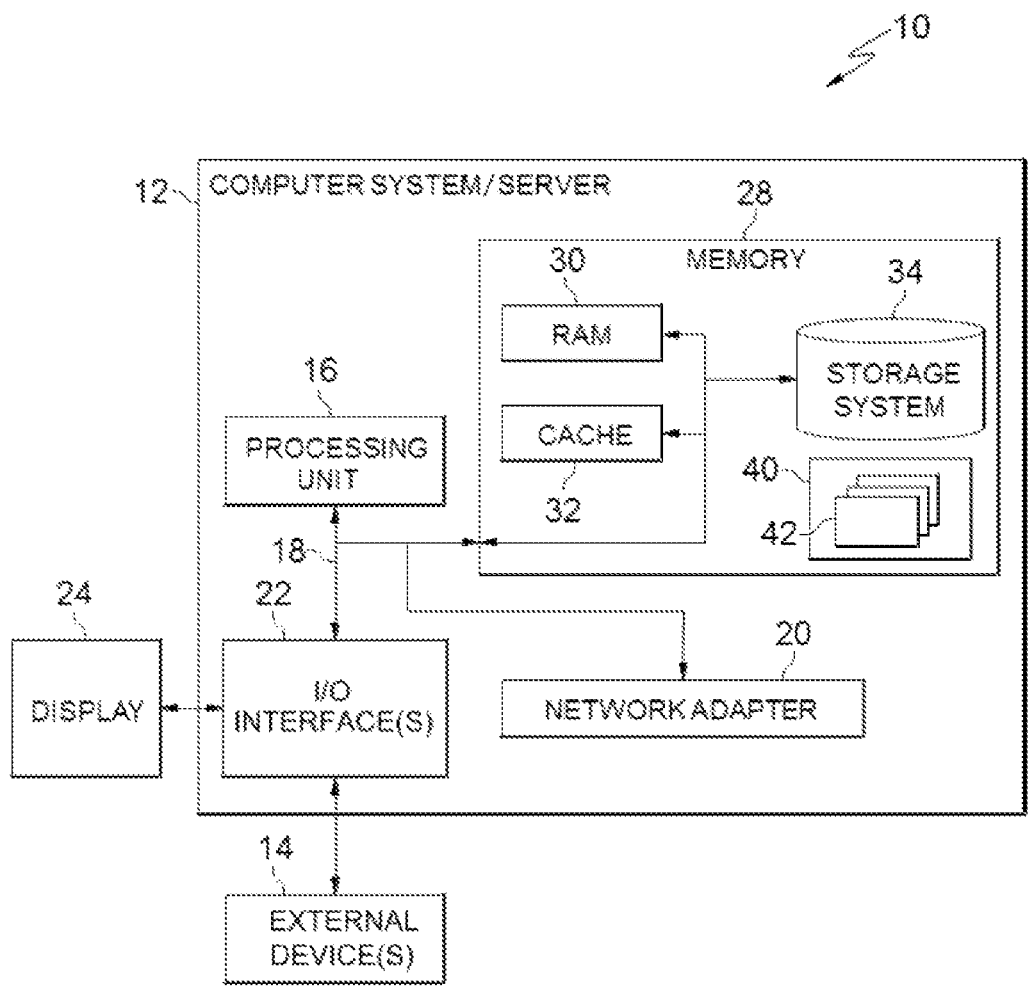
FIG. 1 depicts a cloud computing node, according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
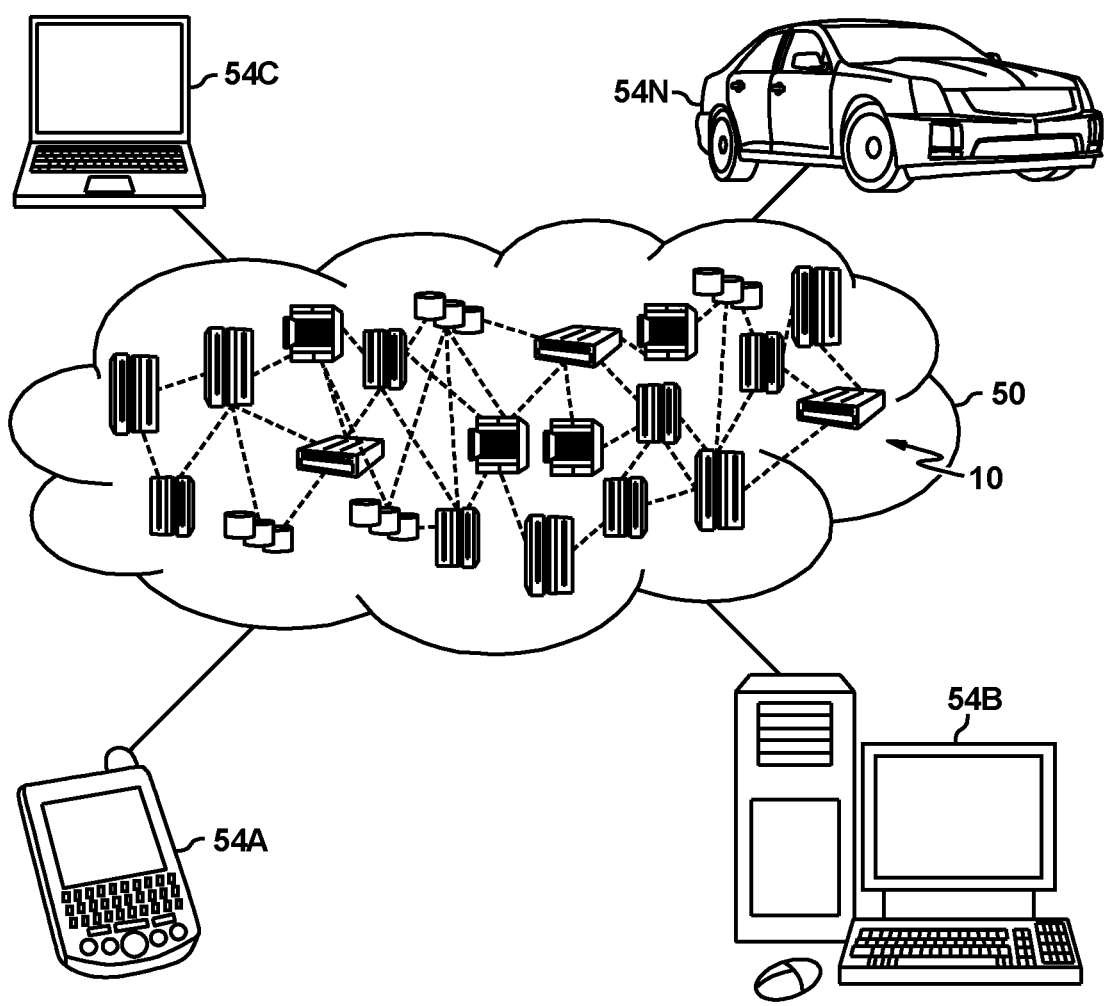
FIG. 2 depicts a cloud computing environment, according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
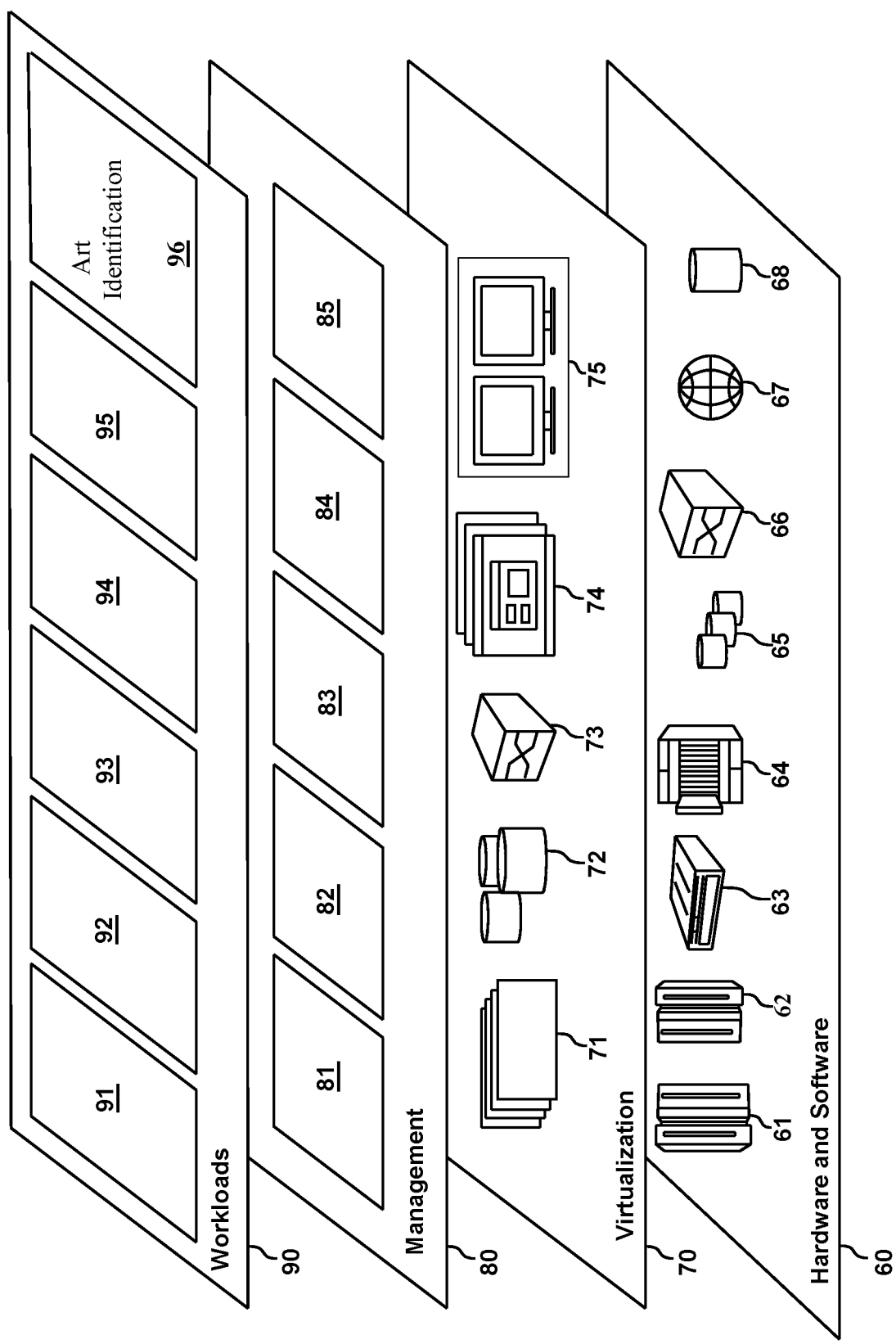
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamically distributing sequential read streams across synchronous mirror pairs 96.

With reference now to accompanying drawings, exemplary embodiments of the present invention will be described. The exemplary embodiments are directed to a method, system and computer program product for dynamically distributing sequential read streams across synchronous mirror pairs.

In a data mirroring system employing synchronous mirroring, data is typically maintained in volume pairs. The volume pairs comprise a primary volume in a primary storage and a corresponding secondary volume in a secondary storage that includes an identical synchronous copy of the data in the primary volume. The primary storage and the secondary storage may be connected in a storage area network (SAN) which includes one or more hosts writing data to, and reading data from, the storage devices accessed through one or more storage controllers.

Conventionally, writing is performed on both the primary volume and the secondary volume, and write workload is distributed to both the primary storage and the secondary storage. Reading is performed only from the primary volume and read workload is only distributed to the primary storage.

In an application system such as a banking system, there are typically two types of jobs, regular jobs and batch jobs. Regular jobs involve random input-output (I/O), and/or random/sequential mixed I/O. The I/O throughput and the I/O rate for the regular jobs do not fluctuate greatly. I/O throughput may be more important than I/O rate for batch jobs which mainly involve sequential I/O. Bursts of sequential I/O may overdrive storage arrays such as RAID (Redundant Arrays of Independent Drives) storage arrays. RAID systems have a maximum I/O capacity determined as 1/(seconds per I/O). Systems exceeding this maximum I/O capacity are considered to be overdriven. When the RAID storage arrays become overdriven, the performance is degraded. The response time for random I/O increases. And the I/O throughput and the I/O rate of the sequential I/O are limited. With the burst of sequential I/O in the batch jobs, the high capacity flash drives of the RAID, tend to be overdriven.

The present disclosure makes use of the available capability of the secondary storage. Specifically, the disclosed methods dynamically redirect sequential read commands across the primary storage and the secondary storage to alleviate the burden upon the disk arrays of the primary storage due to burst of sequential read commands. The redirection of the sequential read commands improves the effectiveness of the memory/cache prefetching.

Figure 4:
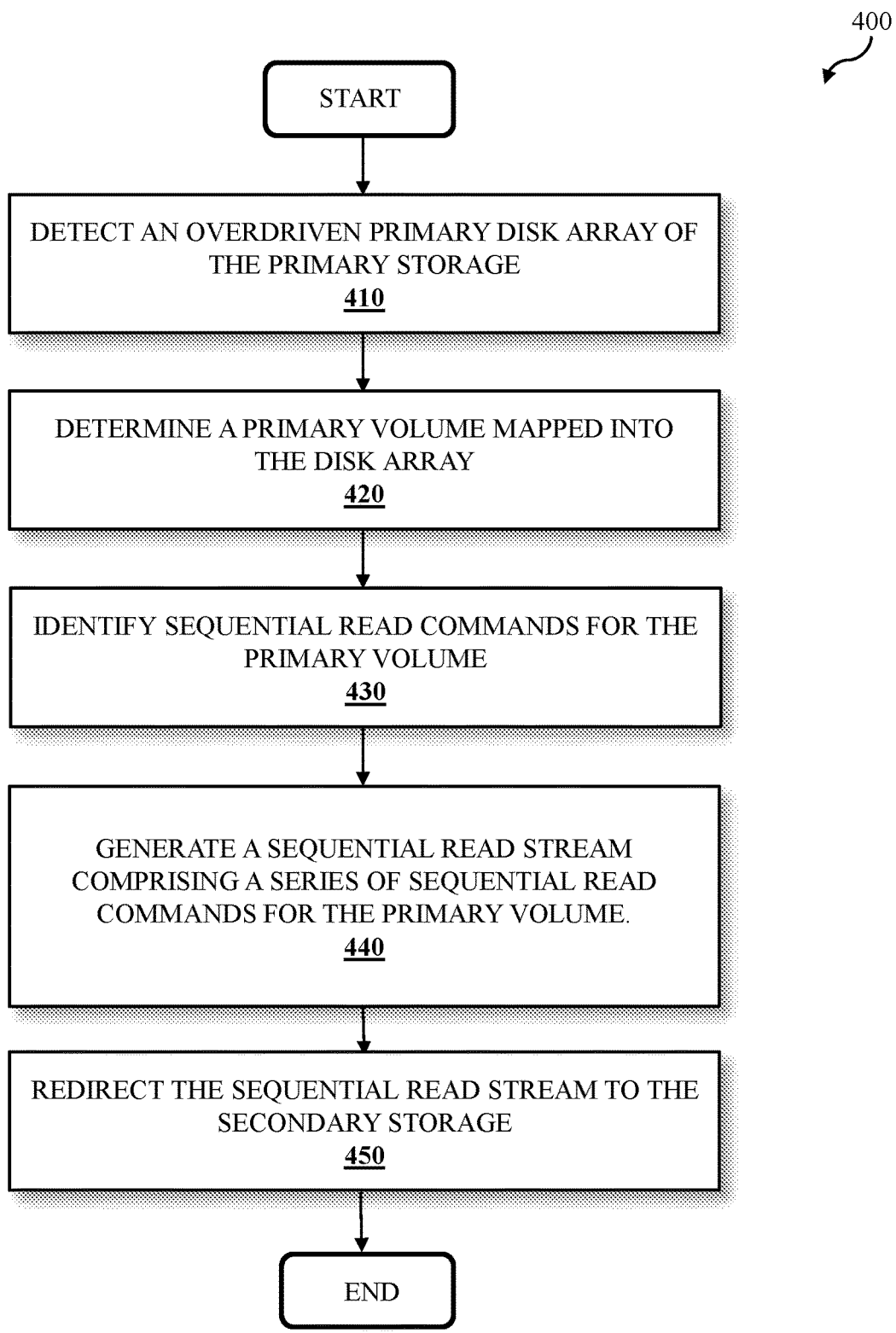
FIG. 4 depicts a flowchart of a method, according to an embodiment of the present invention.
Figure 5:
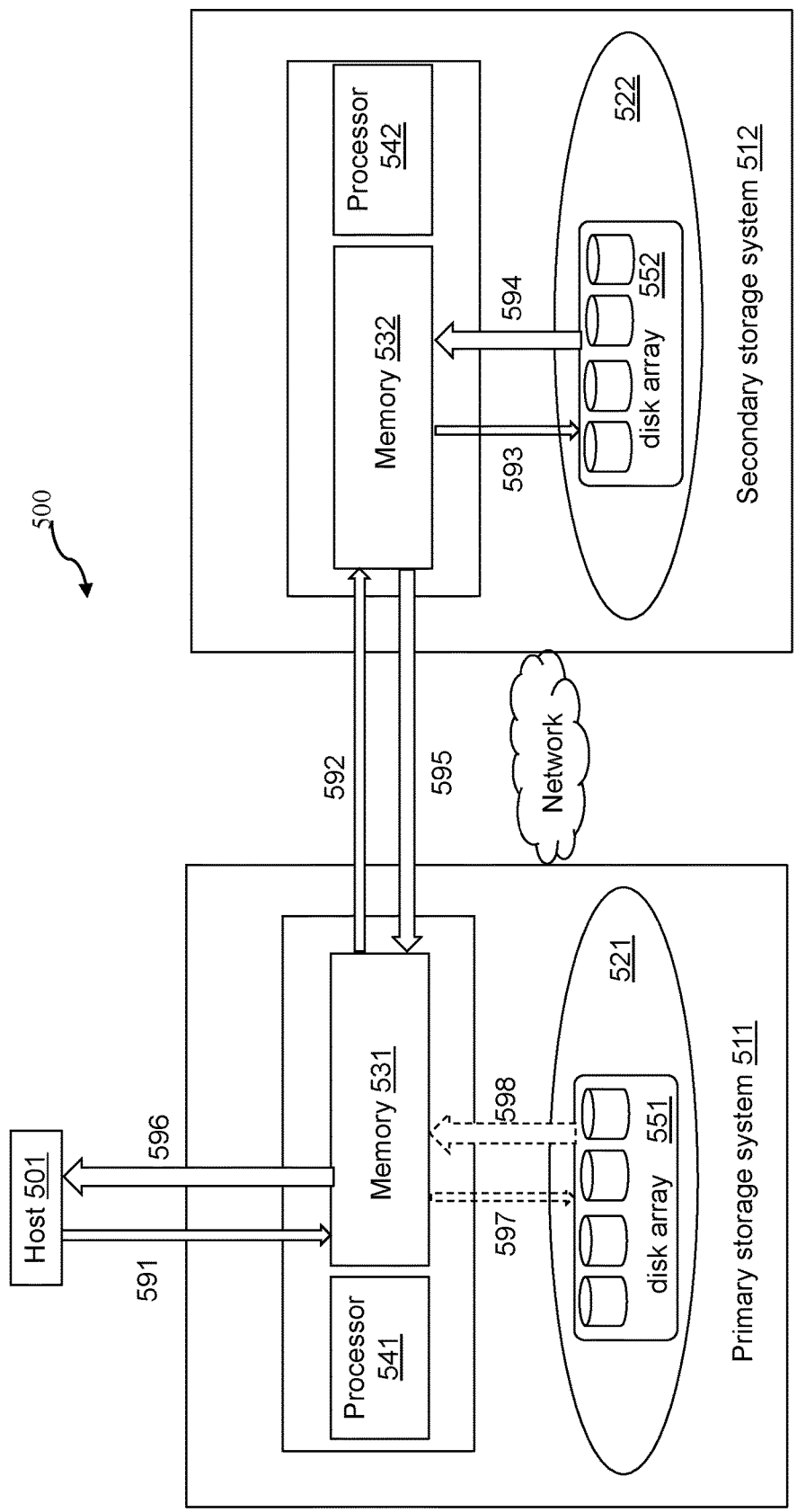
FIG. 5 depicts a schematic diagram of a system in which embodiments of the method of FIG. 4 may be implemented, according to an embodiment of the present invention.

Refer to FIG. 4, which shows a flowchart of a computer-implemented method 400 for operating a data mirroring system comprising a primary storage and a secondary storage that maintains a synchronous copy of data in the primary storage, according to an embodiment of the present disclosure. FIG. 5 shows an example schematic diagram of a data mirroring system 500 in which method 400 of FIG. 4 may be implemented, according to an embodiment of the present disclosure.

As shown in FIG. 5, system 500 consists of a primary storage system 511 and a secondary storage system 512 that are communicatively coupled via networks. The primary storage system 511 comprises a primary storage (also referred to as "storage pool") 521, a memory 531 and a processor 541. The primary storage 521 is composed of disk arrays 551.

Secondary storage system 512 is of the same configuration as primary storage system 511. Specifically, secondary storage system 512 comprises a secondary storage 522 composed of disk arrays 552, a memory 532 and a processor 542. Secondary storage 522 maintains a synchronous copy of data in primary storage 521.

According to an embodiment of the present disclosure, primary disk arrays 551, as well as secondary disk arrays 552, may be RAID arrays. In the following paragraphs, RAID arrays will serve as representative of the disk arrays of system 500. As shall be appreciated by those of ordinary skill in the art, a storage pool aggregates extents from a set of RAID arrays, forming a domain for extent allocation to volumes. A volume consists of a set of extents and may be created from the extents across multiple RAID arrays. The address (e.g., LBA: logical block address) of data in a volume can be translated to a corresponding address in a RAID array. The address translation may be maintained in a table.

Back to FIG. 4, generally, method 400 comprises steps 410 to 450 that may be executed by one or more processors, such as processor 541. To have an overview of the method before detailed description, its steps are listed below.

(410) detecting at least one overdriven disk array of the primary storage;
(420) determining one or more primary volumes mapped into the at least on overdriven disk array;
(430) identifying sequential read commands to the one or more primary volumes;
(440) generating at least one sequential read stream, each generated sequential read stream comprising a series of sequential read commands to one of the primary volumes; and
(450) redirecting one or more of the at least one sequential read stream to the secondary storage.

Method 400 is executed during the operation of system 500. In operation, host 501 may request to read data from, or write data to, disk arrays 551 of primary storage 521, with read/write commands to volumes mapped into disk arrays 551. According to embodiments of the present disclosure, during the operation, the performance of disk arrays 551 in primary storage 521 is monitored continuously or periodically.

At step 410, method 400 detects that at least one disk array of the primary storage is overdriven.

For ease of description, in the following description, it is supposed that primary storage 521 comprises n RAID arrays, denoted as RA_p1, RA_p2 . . . RA_pn, respectively. And secondary storage 522 comprises m corresponding RAID arrays, denoted as RA_s1, RA_s2 . . . RA_sm, respectively.

According to an embodiment of the present disclosure, method 400 measures the performance of individual RAID arrays, RA_p1, RA_p2 . . . RA_pn, according to one of the following performance indicators:
  I/O throughput;
  I/O rate; or
  average response time.

For the sake of simplicity, in the following description, "I/O throughput" will be taken as representative of the performance indicators. Thus, in operation, method 400 monitors the I/O throughput of primary RAID arrays RA_p1, RA_p2 . . . RA_pn against a pre-defined threshold. If the I/O throughput of any primary RAID array exceeds the threshold, method 400 identifies the RAID array as overdriven.

As a non-limiting example, assume the threshold is 800 (MB/s). That is, if the I/O throughput of a RAID array exceeds 800 MB/s, it is regarded to be overdriven. In step 410, suppose it is found that the I/O throughput of a certain RAID array RA_p1 is 2000, which is larger than 800. Therefore, at least one disk array RA_p1 is detected to be overdriven. Method 400 proceeds to step 420.

Step 420 involves determining one or more primary volumes mapped into the at least one disk array detected to be overdriven, which is RA_p1 in the instant case.

In an embodiment, method 400 determines the primary volumes from a mapping table that contains the mapping relationship between primary volumes and primary disk arrays. In the instant case, method 400 detects that RA_p1 is overdriven. From the mapping table, method 400 determines all primary volumes that are mapped into RA_p1. For the example, two primary volumes, denoted as Vol_p1i and Vol_p1j, are determined in step 420.

Following step 420, step 430 involves identifying sequential read commands to the primary volumes as determined in step 420.

Host 501 sends read commands targeting at primary volumes. In some embodiments, a read command may look like READ(VOL_P, Start_LBA, Size). The parameter "VOL_P" represents a volume, "Start_LBA" represents a starting logical block address (LBA), and "Size" represents the size of data. As shall be appreciated by those of ordinary skill in the art, a primary volume can be created across multiple RAID arrays. The address (LBA) of a data in a volume can be translated to an address in a primary RAID array using an address translation table.

Sequential read commands are read commands that access adjacent addresses (LBAs) in a volume or addresses with some recognized patterns in a volume. Using the parameters <VOL_P, Start_LBA, Size>, method 400 identifies sequential read commands to the primary volumes as determined in step 420.

Following step 430, step 440 involves generating at least one sequential read stream, each sequential read stream comprising a series of sequential read commands, as identified in step 430, to one of the primary volumes as determined in step 420.

In the instant case, two primary volumes Vol_p1i and Vol_p1j are determined in step 420. Method 400 groups the sequential read commands that are identified step 430 into sequential read streams according to the two primary volumes.

For example, SRS_Vol_p1i_1 is a first sequential read stream(SRS) that comprises a first series of sequential read commands to the first primary volume Vol_p1i, and SRS_Vol_p1i_2 is a second sequential read stream that comprises a second series of sequential read commands to the first primary volume Vol_p1i.

Similarly, SRS_Vol_p1j_1 is a first sequential read stream that comprises a first series of sequential read commands to the second primary volume Vol_p1j, and SRS_Vol_p2j_2 is a second sequential read stream that comprises a second series of sequential read commands to the second primary volume Vol_p1j.

As mentioned above, a sequential read stream is a series of read commands which access adjacent volume addresses or volume addresses with some recognized patterns. For each primary volume, there may be more than one associated sequential read stream. In the instant case, there are two sequential read streams, SRS_Vol_p1i_1 and SRS_Vol_p1i_2, that are associated with first primary volume Vol_p1i. And there are two sequential read streams, SRS_Vol_p1j_1 and SRS_Vol_p1j_2, associated with the second primary volume Vol_p1j.

Following step 440, at step 450, method 400 redirects one or more of the at least one sequential read streams generated in step 440, to secondary storage 512.

Redirection of a sequential read stream means that all the read commands included in the sequential read stream are redirected to secondary storage 512. The redirection of a read command and its associated operations are illustrated by lines 591, 592, 593, 594, 595, and 596, in FIG. 5.

Line 591 represents a read command READ_(Vol_p1i, Start_LBA, Size) from host 501, which is included in a sequential read stream, for example, SRS_Vol_p1i_1. The read command is targeting at the first primary volume Vol_p1i.

In step 450, the read command READ_(Vol_p1i, Start_LBA, Size) 591 is changed to a read command READ_(VOL_s1i, Start_LBA, Size) 592. Read command 592 targets at a secondary volume Vol_s1i, which is corresponding to the primary volume Vol_p1i.

The read command READ_(VOL_s1i, Start_LBA, Size) 592 is directed to memory 532. In case of a read miss, meaning that the data requested by the read command is not in memory 532, disk arrays 552 will be accessed to retrieve the data, as indicated by line 593. The data will be staged from disk arrays 552 to memory 532, as indicated by line 594. And the data is sent to memory 531, as indicated by line 595. Finally, the data is returned to host 501, as indicated by line 596.

In case of a read hit, meaning that the data is in memory 532, there is no operation indicated by line 593, which means that the disk arrays 552 will not be accessed. The data is sent to memory 531 (595) and returned to host 501 (596).

Those of ordinary skill in the art shall be appreciated that, had the read command 591 not been redirected to secondary storage, the primary disk arrays 551 might have been accessed (597) to retrieve data, stage the data to memory 531 (598) before the data is returned to host 501 (596).

Therefore, the redirection of sequential read streams in step 450 will relieve the burden of overdriven primary disk arrays associated with the sequential read commands, thereby improving the performance of the primary disk arrays. For example, the command response time may be shortened.

According to an embodiment of the present disclosure, responsive to one or more of the sequential read streams being redirected to the secondary storage in step 450, method 400 prefetches data to memory 531 of primary storage 511 from secondary storage 512 based on the one or more of the sequential read streams.

Those of ordinary skill in the art shall appreciate that host access to sequential data may have some patterns. The addresses of the data which will be accessed by subsequent read commands may be predicted according to some cache algorithm. The data expected to be addressed from backend storage may be staged to the memory/cache ahead of time so as to improve the read hit ratio. As previously mentioned, a sequential read stream is a series of sequential read commands which access adjacent volume addresses or volume addresses with some recognized patterns. Given a sequential read stream, method 400 predicts the addresses of the data to be accessed by subsequent read commands With the predicted addresses, method 400 prefetches the data to memory 532 from secondary storage 522 (line 594), and sends the data to memory 531 of primary storage system 511 (line 595). As a result, the hit ratio for subsequent read commands from host 501 may be increased, thereby I/O accesses to disk arrays 551 of primary storage 521 may be reduced.

In the above paragraphs, steps 410 to 450 of method 400 have been illustrated with reference to one exemplary primary disk array RA_p1. It shall be appreciated that the steps may be repeated while the performance of the primary disk arrays is monitored continuously. Method 400 may detect multiple overdriven disk arrays in step 410. For example, in step 410, method 400 detects another primary disk array RA_p2 as overdriven because its I/O throughput is found to be 1500, larger than the 800 threshold. In that case, method 400 performs steps 420 to 450 in association with RA_p2 as well as RA_p1.

Those of ordinary skill in the art shall appreciate that, for the sake of balance, in the case of multiple sequential read streams, it is not always necessary to redirect all of the sequential read streams to secondary storage 522. In an embodiment, method 400 redirects only selected generated sequential read streams, according to the degree to which disk arrays associated with the generated sequential read streams are overdriven.

Referring again to FIG. 4, according to an embodiment of the present disclosure, prior to redirecting one or more of the sequential read streams to the secondary storage at step 450, method 400 calculates redirection weights for the sequential read streams generated in step 440. Then, method 400 selects one or more of the sequential read streams according to the calculated redirection weights.

According to an embodiment of the present disclosure, for each of the sequential read streams, the redirection weight is a function of at least one of two factors. The first factor is the percentage of the total data for the sequential read stream read from the combination of overdriven disks of the disk arrays associated with the sequential read stream. The second factor is the value of a performance indicator of each of the disk arrays associated with the sequential read stream.

Taking sequential read stream SRS_Vol_p1i_1 for example. The sequential read stream SRS_Vol_p1i_1 consists of read commands like READ_(Vol_p1i, Start_LBA, Size). The parameters of the read commands may be mapped to a range of physical addresses. Based on the mapped range of physical addresses, method 400 identifies associated disk arrays. In this way, method 400 identifies all associated primary disk arrays. Also, method 400 determines the percentage of the total data associated with the sequential read stream to be read from each of the disk arrays.

Suppose sequential read stream SRS_Vol_p1i_1 is associated with disk arrays RA_p1, RA_p2, RA_p3 and RA_p4, and the percentage of the total data for the sequential read stream is 40% from RA_p1, 30% from RA_p2, 20% from RA_p3 and 10% from RA_p4.

For the example, the throughput of RA_p1 is 2000 MB/s. The throughput of RA_p2 is 1500 MB/s. The throughput of RA_p3 is 1000 MB/s. The throughput of RA_p4 is 600 MB/s. Note that the throughput of each of three disk arrays RA_p1, RA_p2 and RA_p3 is greater than the threshold of 800 MB/s, so method 400 detects the three disk arrays as overdriven. In this example, the performance indicators for the three disk arrays are 2000, 1500, and 1000, respectively.

In an embodiment, method 400 calculates the redirection weight for SRS_Vol_p1i_1 as one of the following.

(1) the sum of the percentage of the total data for the sequential read stream from each of overdriven disk arrays associated with the sequential read stream. In the instant case, the redirection weight is 40%+30%+20%=0.9.

(2) the sum of performance indicator of each of overdriven disk arrays associated with the sequential read stream. In the instant case, the redirection weight is 2000+1500+1000=4500; or (3) the sum of percentage of total data for the sequential read stream from each of overdriven disk arrays associated with the sequential read stream multiplied by corresponding performance indicator. In the instant case, the redirection weight is: 40%*2000+30%*1500+20%*1000=1450.

After method 400 calculates the redirection weights for the associated sequential read streams, the associated sequential read streams are sorted in the descending order of their redirection weights. Then, method 400 selects the first N (N>=1) sequential read streams according to the sorted order. Method 400 redirects the selected one or more sequential read streams in step 450.

In the above paragraphs, description of method 400 focuses on distributing sequential read streams from primary storage system 511 to secondary storage system 522.

According to embodiments of the present disclosure, during the operation of data mirroring system 500, method 400 also continuously monitors the performance of disk arrays 552 in primary storage 522.

According to an embodiment of the invention, method 400 further comprises the following additional steps: First, method 400 detects, by one or more processors, that at least one disk arrays 552 of the secondary storage 522 is overdriven. In response, method 400 determines all secondary volumes mapped into the at least one overdriven disk array of the secondary storage. Then, method 400 identifies sequential read commands to the secondary volumes. Method 400 then generates a set of sequential read streams using the sequential read commands, wherein each set of sequential read streams comprises a series of sequential read commands to one of the secondary volumes. Method 400 then redirects one or more of the set of sequential read streams is redirected back to the primary storage 521.

As shall be appreciated by those of ordinary skill in the art, the operation and the implementation of the additional steps are corresponding and similar to steps 410 to 450. Therefore, the additional steps are readily understood without repeated description of their details. With the additional steps, if performance of any disk array of secondary system 512 becomes degraded, read commands associated with it, which were redirected from primary storage system 511, will be redirected back to primary storage system 511. As shall be appreciated by those of ordinary skill in the art, alternatively or in addition, if the performance indicator of the RAID arrays (available) in the primary storage becomes below the corresponding threshold, the associated sequential read streams may also be redirected back to the primary storage.

It should be noted that the processing of dynamically distributing sequential read streams across synchronous mirror according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for operating a data mirroring system comprising a primary storage and a secondary storage that maintains a synchronous copy of data in the primary storage, the method comprising:
    monitoring, by one or more processors, a performance of a disk array;
    detecting, by the one or more processors, at least one overdriven-disk array of the primary storage exceeding an I/O capacity of the disk array, according to the monitoring;
    determining, by the one or more processors, a primary volume comprising a logical block address, mapped into the at least one overdriven disk array;
    identifying, by the one or more processors, sequential read commands to the primary volume, wherein the sequential read commands are read commands that access adjacent addresses in the primary volume, or addresses with some recognized patterns in the primary volume;
    generating, by the one or more processors, at least one sequential read stream comprising a series of the sequential read commands to the primary volume; and
    redirecting, by the one or more processors, at least one sequential read stream away from the at least one overdriven disk array and to the secondary storage.

2. The computer-implemented method of claim 1, further comprising:
    monitoring a performance indicator of each disk array in the primary storage, the performance indicator selected from the group consisting of: I/O throughput, I/O rate, and average response time; and
    wherein said detecting at least one overdriven disk array of the primary storage is responsive to a determination that the performance indicator of at least one disk array exceeds a threshold.

3. The computer-implemented method of claim 2, further comprising:
    calculating, by the one or more processors, respective redirection weights for the sequential read streams;
    sorting, by the one or more processors, the sequential read streams by the redirection weights; and
    selecting, by the one or more computer processors, the one or more of the sequential read streams in order of the redirection weights;
    wherein the sequential read streams are redirected, by one or more computer processors, according to the selection.

4. The computer-implemented method of claim 3, wherein the redirection weight for each of the sequential read streams is a function of a factor selected from the group consisting of: a percentage of total data for the sequential read stream from the overdriven disk arrays associated with the sequential read stream, and a value of the performance indicator of each of overdriven disk arrays associated with the sequential read stream.

5. The computer-implemented method of claim 1, further comprising:
    prefetching, by the one or more processors, data to a memory of the primary storage from the secondary storage based on the one or more of the sequential read streams.

6. The computer-implemented method of claim 5, further comprising:
 detecting at least one overdriven disk array of the secondary storage;
 determining a secondary volume mapped into the at least one overdriven disk array of the secondary storage;
 identifying secondary sequential read commands to the secondary volume, wherein the secondary sequential read commands are read commands that access adjacent addresses in the secondary volume, or addresses with some recognized patterns in the secondary volume;
 generating at least one sequential read stream comprising a series of the secondary sequential read commands to the secondary volume; and
 redirecting at least one sequential read stream back to the primary storage.

7. The computer-implemented method of claim 1, wherein the at least one disk array is RAID array.

8. A system comprising:
 one or more processors; and
 a computer-readable memory coupled to the one or more processors, the computer-readable memory comprising instructions for operating a data mirroring system comprising a primary storage and a secondary storage that maintains a synchronous copy of data in the primary storage, which, when executed by the one or more processors, perform actions of:
  monitoring a performance of a disk array;
  detecting at least one overdriven disk array of the primary storage exceeding an I/O capacity of the disk array, according to the monitoring;
  determining a primary volume comprising a logical block address, mapped into the at least one overdriven disk array;
  identifying sequential read commands to the primary volume, wherein the sequential read commands are read commands that access adjacent addresses in the primary volume, or addresses with some recognized patterns in the primary volume;
  generating at least one sequential read stream comprising a series of the sequential read commands to the primary volume; and
  redirecting at least one sequential read stream away from the at least one overdriven disk array and to the secondary storage.

9. The system of claim 8, wherein the actions further comprise:
 monitoring a performance indicator of each of all disk arrays in the primary storage, the performance indicator selected from the group consisting of: I/O throughput, I/O rate, and average response time; and
 wherein said action of detecting at least one overdriven disk array of the primary storage is responsive to a determination that the performance indicator of at least one disk array exceeds a threshold.

10. The system of claim 9, wherein the actions further comprise:
 calculating respective redirection weights for the sequential read streams;
 sorting the sequential read streams by the redirection weights; and
 selecting the one or more of the sequential read streams in order of the redirection weights; and
 wherein the sequential read streams are redirected, by one or more computer processors, according to the selection.

11. The system of claim 10, wherein the redirection weight for each of the sequential read streams is a function of a factor selected from the group consisting of:
 a percentage of total data for the sequential read stream from overdriven disk arrays associated with the sequential read stream; and
 a value of the performance indicator of each overdriven disk arrays associated with the sequential read stream.

12. The system of claim 8, wherein the actions further comprise:
 prefetching data to a memory of the primary storage from the secondary storage based on the one or more of the sequential read streams.

13. The system of claim 12, wherein the actions further comprise:
 detecting at least one overdriven disk array of the secondary storage;
 determining a secondary volume mapped into the at least one overdriven disk array of the secondary storage;
 identifying secondary sequential read commands to the secondary volume, wherein the secondary sequential read commands are read commands that access adjacent addresses in the secondary volume, or addresses with some recognized patterns in the secondary volume;
 generating at least one sequential read stream comprising a series of the secondary sequential read commands to the secondary volume; and
 redirecting at least one sequential read stream back to the primary storage.

14. The system of claim 8, wherein the at least one disk array is RAID array.

15. A computer program product for operating a data mirroring system comprising a primary storage and a secondary storage that maintains a synchronous copy of data in the primary storage, comprising a computer readable storage medium having program instructions embodied therewith, the program instructions executable by a processor to cause the processor to perform actions of:
 monitoring a performance of a disk array;
 detecting at least one overdriven disk array of the primary storage exceeding an I/O capacity of the disk array, according to the monitoring;
 determining a primary volume comprising a logical block address, mapped into the at least one overdriven disk array;
 identifying sequential read commands to the primary volume, wherein the sequential read commands are read commands that access adjacent addresses in the primary volume, or addresses with some recognized patterns in the primary volume;
 generating at least one sequential read stream comprising a series of the sequential read commands to the primary volume; and
 redirecting at least one sequential read stream away from the at least one overdriven disk array and to the secondary storage.

16. The computer program product according to claim 15, wherein the actions further comprise:
 monitoring a performance indicator of each of all disk arrays in the primary storage, the performance indicator selected from the group consisting of: I/O throughput, I/O rate, and average response time; and
 wherein said action of detecting at least one overdriven disk array of the primary storage is responsive to a determination that the performance indicator of at least one disk array exceeds a threshold.

17. The computer program product according to claim 16, wherein the actions further comprise:
- calculating respective redirection weights for the sequential read streams;
- sorting the sequential read streams by the redirection weights;
- selecting the one or more of the sequential read streams in order of the redirection weights; and
- wherein the sequential read streams are redirected, by one or more computer processors, according to the selection.

18. The computer program product according to claim 17, wherein the redirection weight for each of the sequential read streams is a function of a factor selected from the group consisting of:
- a percentage of total data for the sequential read stream from overdriven disk arrays associated with the sequential read stream; and
- a value of the performance indicator of each overdriven disk arrays associated with the sequential read stream.

19. The computer program product according to claim 15, wherein the actions further comprise:
- prefetching data to a memory of the primary storage from the secondary storage based on the one or more of the sequential read streams.

20. The computer program product according to claim 19, wherein the actions further comprise:
- detecting at least one overdriven disk array of the secondary storage;
- determining a secondary volume mapped into the at least one overdriven disk array of the secondary storage;
- identifying secondary sequential read commands to the secondary volume, wherein the secondary sequential read commands are read commands that access adjacent addresses in the secondary volume, or addresses with some recognized patterns in the secondary volume;
- generating at least one sequential read stream comprising a series of the secondary sequential read commands to the secondary volume; and
- redirecting at least one sequential read stream back to the primary storage.

\* \* \* \* \*